Nov. 3, 1931.   E. L. HOFFMAN   1,830,059
AERIAL SAFETY BELT
Filed May 17, 1930
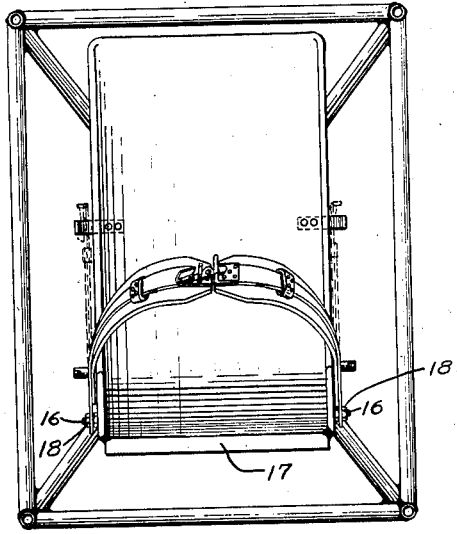
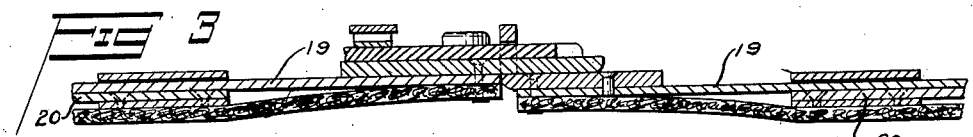
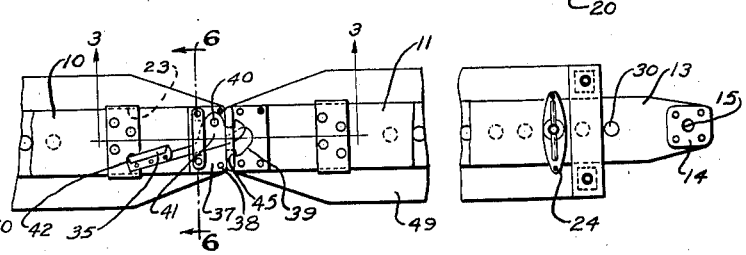
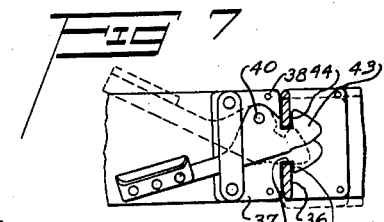
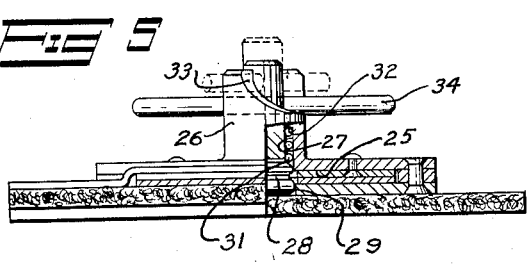
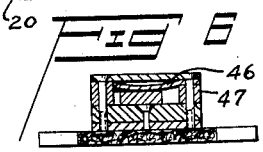
INVENTOR
EDWARD L. HOFFMAN
BY
ATTORNEY Patented Nov. 3, 1931

1,830,059

UNITED STATES PATENT OFFICE

EDWARD L. HOFFMAN, OF DAYTON, OHIO

AERIAL SAFETY BELT

Application filed May 17, 1930. Serial No. 453,336.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

The present invention relates generally to improvements in aircraft and more particularly wherein the improvements are directed toward providing a safety belt to permit the aviator to be securely strapped in the seat of the aircraft with greater safety than has been obtained in the past.

Heretofore, the so-called "safety belts" used on aircraft have generally been made of fabric or other woven materials which, due to their extreme flexibility were difficult to adjust for persons of different stature and were subject to deterioration, consequently weakening with age.

Furthermore, in many instances, aviators have been accidently thrown out of an airplane, some with fatal consequences as a result of their safety belts having become inadvertently opened, yet giving no warning of the fact of such condition. Safety belts of this conventional type were difficult to stow out of the way when not in use so that they were always readily accessible for use; this due mainly to the general make-up of the belt itself.

The primary object, therefore, of the present invention is to provide a new and improved "safety belt" of novel construction for the pilot or passengers of an aircraft which comprises essentially two readily separable members having means for effectively holding the ends of said members connected together against accidental separation when in locking relation regardless of the position of the aircraft and yet so arranged that quick release from the belt is possible in case of an emergency jump from the aircraft or when in a crash.

Another object of the present invention is to provide a belt constructed in such manner that the two separable members forming the belt structure are normally tensioned when the belt is secured about the body of an aviator. A belt having this general characteristic will give instant notice of any accidental separation of the locking element attached to the free ends of the belt by forcibly striking the aviator about some portion of the body, such as the arms, should such event occur.

The invention is further characterized by the provision of a belt constructed substantially entirely of flat flexible strips of spring material, the free ends of which when fastened together to hold the aviator in his seat, are placed in tension and having means for adjusting the over-all length of the strips to adjust for the difference in stature of different aviators.

The invention is further characterized by the provision of a quickly releasable catch for the free ends of the separable members forming the belt, which is strong both in general make-up and in its resistance to any opening action, either intentional or accidental, produced by the usual pull thereon. A belt constructed in the manner of the present invention is not only easily stowed in the aircraft but also is readily accessible when needed. Furthermore, a belt of this general construction permits of its being secured to the seat of the aircraft so as to frictionally engage with the seat. In this manner the belt can easily be adjusted to any desired position relative to the seat or "parked" in any desired out-of-the-way position.

From the aforementioned objects and purposes of the invention, it will be apparent that I have devised a safety belt having in mind the increased safety of the aviator. My invention also consists in certain other features of construction and in the combination and arrangement of the several parts to be hereinafter fully, clearly and concisely described, defined in the appended claims and illustrated in the accompanying drawings in which Fig. 1 is a plan view of the improved belt showing same attached to the seat of an aircraft.

Fig. 2 is a plan view of the belt per se showing latching and adjusting mechanism.

Fig. 3 is a sectional view taken on the line 3—3 of Fig. 2.

Fig. 4 is a side elevation of Fig. 2.

Fig. 5 is a part sectional view taken on the line 5—5 of Fig. 2

Fig 6 is a cross sectional view taken on the line 6—6 of Fig. 2.

Fig. 7 is an enlarged detail view of the latching device.

Referring more particularly to the drawings wherein corresponding parts are designated by like numerals throughout the various views thereof, the safety belt in the preferred embodiment of my invention herein illustrated comprises generally two separable members 10 and 11 respectively, each member being secured to the fuselage of an aircraft in any suitable manner, in the present instance, the ends 12 and 13 of each member being provided with reinforcing plates 14, having openings 15 provided therein adapted to be mounted on studs 16 extending from the sides of the seat 17 of the aircraft. The studs 16 are suitably threaded as shown to receive lock nuts 18, any suitable friction engaging means such as lock washers or the like (not shown) being interposed between the locking nuts and reinforcing plates whereby the separable members may be frictionally engaged to maintain the said members in any desired position when upright or stowed out of the way at the rear of the seat as shown in dotted position in Fig. 1.

It is intended that the separable members shall be made of non-corrosive metal such as spring bronze or the like whereby to eliminate corrosion and prevent weakening of the belt with age.

Each separable member comprises essentially two flat strips of metal having a substantial width which are adapted to overlie one another as shown in Figs. 2 and 3, thus providing an upper strap 19 and a lower strap 20. To the free end 21 of the lower strap 20, is secured a guide flap 22 provided with a slotted opening 23 for the reception of the upper strap 19. Each upper strap is provided at its inner end with a locking device generally indicated by numeral 24, Fig. 2. This locking device is provided with a slotted opening 25 to permit the lower strap 20 to slide back and forth in a manner to be more fully explained hereinafter. The locking device aforementioned is provided with a projecting portion 26 having an opening 27 therein, within which opening a locking plunger 28 is adapted to slidably function. This plunger is suitably provided with a head portion 29 which engages with any one of a series of holes 30 provided in the lower strap 20 as shown in Figs. 2 and 5 respectively.

The head portion of the locking plunger is backed up by a coiled spring 31, one end of which contacts with the head portion 29, the other end abutting against a shoulder 32 provided in the projection portion 26. Oppositively disposed formed cam surfaces 33 are provided in each projection portion 26, which are for the purpose of providing guideways for a lock releasing pin 34, mounted in the end of the locking plunger as shown in Fig. 5. From the foregoing description, it will be apparent that as the releasing pin 34 is rotated in a clockwise direction, the locking plunger will be raised to disengage with the hole in the lower strap 20. By such an arrangement, each member 10 or 11 may be adjusted to increase or decrease its individual length to best suit the requirements of the aviator. Each member is provided with a locking device in order to obtain any desired degree of adjustment and a description of the one will suffice for both. When the locking plunger is manually released, it is forcibly urged into the next succeeding opening in the lower strap to again lock the strap against further adjustment.

The safety belt is also provided with a quickly attachable and detachable "safety" fastener which comprises two interlocking elements, i. e., a latching device 35 and a latch holding element 36 which are respectively secured to the free ends of the upper strap 19. The latching device consists essentially of a locking plate 37 which may be conveniently secured to the upper strap 19 as by rivets 38 or the like and which is formed with a head portion 39 adapted to guide the latch into engagement with the latch holding element 36. Pivotally mounted upon the locking plate 37 as shown at 40, is a locking lever 41 conveniently provided at its one end with an extension 42 providing a hand hold for locking and unlocking the latch. At its opposite ends the locking lever is formed with a locking head 43. The locking head 43 and head portion 39 of the locking plate heretofore mentioned, are each provided with oppositely disposed locking lips 44 and 45, respectively, which serve to hold the locking device to the holding element when in locked position as shown in Fig. 2. To maintain the fastener safely locked against accidental release, a bow-shaped spring 46 carried by a bracket member 47, bears at all turns against the upper face of the locking latch to frictionally engage with the same and hold in any desired position.

When it is desired to release the latching device, the locking lever is moved to the position shown in dotted line in Fig. 7. In this position, it will be noticed that the locking head contacts with the inner face of a slotted opening 48 provided in the element 36 to forcibly move the lip 45 of the locking plate 37 out of engagement with the holding element 36 and permits its removal therefrom. The separable members 10 and 11 of the belt being under tension at the lines, tend immediately to assume the normal position shown in dotted lines in Fig. 1 and give due notice of their separation by forcibly striking the aviator about his arm or other parts of the body.

Each separable member has conveniently mounted thereon auxiliary straps of leather 49 and 50 respectively, having a substantial width which serve the purpose of padding to protect the aviator from any possible injury from the exposed metal portion of the belt.

From the foregoing detailed description of my improved belt construction, it will be seen that I have provided simpler and efficient means for carrying out the several objects of my invention and while I have particularly described the preferred embodiment best adapted to perform the functions at fault, it is obvious that various changes in form and in the minor details of construction may be had without departing from the spirit of the invention.

Having thus described my invention, what I claim as new and desire to secure by Letters Patent is:

1. In combination, a safety belt for the seat of an aircraft comprising separable members adapted to be connected together to hold an aviator in said seat and latching means for securing said members together, said means comprising a latch holding element mounted on the end of one of said members, and a double lipped latching device mounted on the other of said members adapted for interlocking engagement with said latch holding element only one of the lips of said latching device being movable relative to the other lip.

2. In combination, a safety belt for the seat of an aircraft comprising separable members adapted to be connected together to hold an aviator in said seat and latching means for securing said members together, said means comprising a latch holding element mounted on the free end of one of said members and a double lipped latching device mounted on the free end of the other element adapted for interlocking engagement with said latch holding element, one lip of said latching device being fixedly mounted, the other lip of said latching device being mounted for pivotal movement relative to the first mentioned lip.

3. In combination, a safety belt for the seat of an aircraft comprising separable members adapted to be connected together to hold an aviator in said seat and latching means for securing said members together, said means comprising a latch holding element mounted on the free end of one of said members and a latching device mounted on the free end of the other member, said latching device comprising a base plate having a locking lip rigidly connected thereto and a pivoted lever carried by said base plate having a second locking lip movable relative to said first mentioned lip to lockingly engage with said latch holding element.

4. In combination, a safety belt for the seat of an aircraft comprising separable members adapted to be connected together to hold an aviator in said seat and latching means for securing said members together, said means comprising a latch holding element mounted on the free end of one of said members and a latching device mounted on the free end of the other member, said latching device comprising a base plate having a fixed locking lip provided thereon and a locking lever pivotally mounted on said base plate having a locking lip oppositely disposed relative to said first mentioned locking lip and cooperating therewith to lockingly engage with said latch holding element.

5. In combination, a safety belt for the seat of an aircraft comprising separable members adapted to be connected together to hold an aviator in said seat and latching means for securing said members together, said means comprising a latch holding element mounted on the free end of one of said members and a latching device mounted on the free end of the other member, said latching device comprising a base plate having a fixed locking lip provided thereon and a locking lever pivotally mounted on said base plate having a locking lip oppositely disposed relative to said first mentioned locking lip and cooperating therewith to lockingly engage with said latch holding element and means for releasably retaining said locking lever in locked position.

6. In combination, a safety belt for the seat of an aircraft comprising separable members adapted to be connected together to hold an aviator in said seat and latching means for securing said members together, said means comprising a latch holding element mounted on the free end of one of said members and a latching device mounted on the free end of the other member, said latching device comprising a base plate having a locking lip provided thereon and a locking lever pivotally mounted on said base plate having a locking lip oppositely disposed relative to said first mentioned locking lip and cooperating therewith to lockingly engage with said latch holding element and means frictionally engaging said locking lever to releasably retain said lever in locked position.

7. In combination, a safety belt for the seat of an aircraft comprising separable members adapted to be connected together to hold an aviator in said seat and latching means for securing said members together, said means comprising a latch holding element mounted on the free end of one of said members and a latching device mounted on the free end of the other member, said latching device comprising a base plate having a locking lip provided thereon and a locking lever pivotally mounted on said base plate having a locking lip oppositely disposed relative to said first mentioned locking lip and cooperating therewith to lockingly engage with said latch holding element and yieldable means frictionally engaged with said locking lever whereby to releasably retain said locking lever in engagement with said latch holding element.

8. In combination, a safety belt for the seat of an aircraft comprising separable members adapted to be connected together to hold an aviator in said seat and latching means for securing said members together, said means comprising a latch holding element mounted on the free end of one of said members and a latching device mounted on the free end of the other member, said latching device comprising a base plate having a locking lip provided thereon and a locking lever pivotally mounted on said base plate having a locking lip oppositely disposed relative to said first mentioned locking lip and cooperating therewith to lockingly engage with said latch holding element and spring means frictionally engaged with said locking lever to yieldably maintain the locking lip lever in locking cooperative relation with the locking lip on said base plate whereby to prevent accidental separation of said separable members.

9. A safety belt for the seat of an aircraft comprising in combination separable members secured at their outer ends to the seat of said aircraft and adapted to be connected together at their inner ends to hold an aviator in said seat and latching means for securing said members together, each member comprising overlapping elements of springlike material slidably engaging each other and adjusting means cooperating with said elements to regulate the over-all length of said separable members.

10. A safety belt for the seat of an aircraft comprising in combination separable members secured at their outer ends to the seat of said aircraft and adapted to be connected together at their inner ends to hold an aviator in said seat and a latching device for securing the inner ends of said members together, each member comprising superimposed overlapping elements of springlike material adjustably engaged with one another and adjusting means cooperating with said elements to vary the over-all effective length of said elements whereby to adjust said separable members for different lengths.

11. A safety belt for the seat of an aircraft comprising in combination separable members secured at their outer ends to the seat of said aircraft and adapted to be connected together at their inner ends to hold an aviator in said seat and a latching device for securing the inner ends of said members together, each member comprising superimposed telescoping elements of springlike material adjustable longitudinally with respect to one another and adjusting means cooperating with said elements to vary the over-all effective length of said elements whereby to adapt said members to snugly hold the body of the aviator in said seat.

12. An aerial safety belt for the seat of an aircraft comprising in combination separable members secured at their outer ends to the seat of said aircraft and adapted to be connected together at their inner ends to hold an aviator in said seat and latching means for securing the inner ends of said members together, each member consisting of a pair of superimposed telescoping elements of flexible springlike material adjustable longitudinally with respect to one another and adjusting means cooperating with said elements to vary the over-all effective length of said elements whereby to adapt said members to snugly hold the body of the aviator in said seat.

13. An aerial safety belt for the seat of an aircraft comprising in combination separable members adapted to be connected together to hold an aviator in said seat and latching means for securing said members together, each member comprising two flat metallic strips of flexible material superimposed in telescopic relation with one another and adjusting means cooperating with said metallic strips to move one strip longitudinally with respect to the other strip whereby to vary the over-all effective length of said separable members and adapt said members to snugly hold the aviator in said seat.

14. A safety belt for the seat of an aircraft comprising in combination two separable members adapted to be connected together to hold an aviator in said seat and latching means for securing said members together, each member comprising superimposed telescoping elements of springlike material adjustable longitudinally with respect to one another and adjusting means cooperating with said elements to regulate the over-all length of said separable members, said means comprising spring controlled cam operated locking plungers carried by one of said elements adapted to cooperatively engage with openings provided in the other element.

15. A safety belt for the seat of an aircraft comprising in combination two separable members adapted to be connected together to hold an aviator in said seat and latching means for securing said members together, each member comprising superimposed telescoping elements of springlike material adjustable longitudinally with respect to one another, one of said elements having a plurality of openings disposed in spaced relation longitudinally of said element and the other element carrying adjusting means for adjustably securing said elements together, said means comprising a spring controlled cam operated locking plunger adapted to engage with the openings in said first mentioned element.

16. A safety belt for the seat of an aircraft comprising in combination two separable members adapted to be connected together to hold an aviator in said seat and latching means for securing said members together, each member comprising superimposed telescoping elements of springlike material forming top and bottom strips adjustable longitudinally with respect to one another, the bottom strip having a plurality of openings disposed in spaced relation along the longitudinal axis thereof and the top strip having adjustable means mounted thereon cooperating with the bottom strip to permit relative longitudinal movement of said strip, said means comprising a cam operated spring controlled locking plunger adapted to lockingly engage in any desired opening in said bottom strip whereby to regulate the said separable members to fit the occupant of the seat.

17. In combination, a safety belt for the seat of an aircraft comprising separable members adapted to be connected together to hold an aviator in said seat and latching means for securing said members together, said means comprising a latch holding element mounted on the free end of one of said members and a double lipped latching device mounted on the free end of the other member, each of said separable members comprising telescoping elements slidably engaging one another and adjusting means cooperating with said elements to regulate the over-all length of said separable members.

18. A safety belt for the seat of an aircraft comprising in combination separable members adapted to be connected together to hold an aviator in said seat and a readily releasable latching means for securing said members together, each member consisting of a pair of flexible telescoping elements formed of spring material normally tensioned when said members are connected together so constructed and arranged that when released said members are violently separated substantially as and for the purpose set forth.

In testimony whereof I affix my signature.

EDWARD L. HOFFMAN.